US006176657B1

United States Patent
Romph

(10) Patent No.: US 6,176,657 B1
(45) Date of Patent: Jan. 23, 2001

(54) CARGO RESTRAINT ASSEMBLY FOR A VEHICLE CARGO BED

(76) Inventor: Joel Romph, 7400 Reese Rd., Sacramento, CA (US) 95828

( * ) Notice: Under 35 U.S.C. 154(b), the term of this patent shall be extended for 0 days.

(21) Appl. No.: 09/534,610

(22) Filed: Mar. 27, 2000

(51) Int. Cl.$^7$ ........................................... B60P 7/08
(52) U.S. Cl. .............................. 410/94; 410/90; 410/121
(58) Field of Search .................................. 410/90, 91, 94, 410/95, 121, 155; 296/39.2; 188/32

(56) References Cited

U.S. PATENT DOCUMENTS

| | | | |
|---|---|---|---|
| 3,508,764 | * 4/1970 | Dobson et al. | 410/90 |
| 4,887,947 | 12/1989 | Bott | 410/144 |
| 5,549,428 | * 8/1996 | Yeatts | 410/94 |
| 5,655,863 | * 8/1997 | Mundt | 410/94 |
| 5,839,863 | * 11/1998 | Johansson | 410/94 X |
| 6,012,885 | * 1/2000 | Taylor et al. | 410/94 |

* cited by examiner

Primary Examiner—Stephen T. Gordon
(74) Attorney, Agent, or Firm—Donald E. Nist

(57) ABSTRACT

The cargo restraint assembly is for a vehicle cargo bed and includes a vehicle cargo bed liner adapted to lie on the floor of the cargo bed. The liner has spaced parallel grooves extending from the rear to the front of the liner and defined by spaced parallel upstanding ribs. The assembly also includes a cargo stop block having a rear end, opposite front end, top, bottom and opposing sides. The block bottom has parallel spaced forwardly extending ribs defining spaced parallel grooves therebetween. The block ribs and grooves are adapted to mate with the grooves and ribs of the bed liner. The assembly further includes a stop block lock which is adapted to draw the block laterally to engage the sides of the block depending ribs with the sides of the upstanding ribs of the bed liner in order to secure the block in place on the bed liner. In one embodiment the lock has a body with a depending rib which fits in a bed liner groove. The lock is adapted to be positioned adjacent a side of the block and includes a transverse draw screw or threaded draw bolt passing into the block. In another embodiment the lock includes a clamp, one portion of which is secured to the lock body and a second portion of which is secured to the block, with a draw screw spanning the two portions of the clamp. In a further embodiment, the block is split about vertically into two parts and the lock is in the form of a clamp having two portions, one portion being connected to one of the block parts and the other portion being connected to the other of the block parts, with a draw screw spanning the two clamp portions. The sides of the depending block ribs can bear teeth to facilitate engagement with the bed liner ribs. Alternatively, the sides of the block ribs can bear flexible resilient strips which act as wedges to help hold the assembly together.

9 Claims, 1 Drawing Sheet

CARGO RESTRAINT ASSEMBLY FOR A VEHICLE CARGO BED

BACKGROUND OF THE INVENTION

1. Field of the Invention

The present invention generally relates to cargo restraints and more particularly relates to an improved cargo restraint assembly for vehicle cargo beds.

2. Prior Art

Various types of cargo restraints have been proposed for use in the cargo bays of vehicles. One such restraint employs releasable cord ties which hook to the cargo bay and tie down the cargo. Such restraints are often difficult to install and use. Another cargo restraint system is that disclosed in U.S. Pat. No. 4,887,947 to John Bott. That system employs slotted side strips which are aligned with each other and are applied to opposite sides of the inner surfaces of the upraised vertical side panels defining the rear cargo space in a truck. The system also includes an elongated removeable board which spans the width of the cargo bay of the truck and slides into a slot in each of the side strips. This system has limited utility, blocking off the entire truck bed area forward of the board. Moreover, the side strips are difficult to align and apply to the side panels.

Accordingly, there is a need for a simple, inexpensive, durable, easily installed and easy to operate cargo restrain assembly which can be used in the cargo bays of various types of vehicles such as panel trucks, open bed trucks, station wagons, sports utility vehicles and the like.

SUMMARY OF THE PRESENT INVENTION

The improved cargo restraint assembly for a vehicle cargo bed satisfies all the foregoing needs. The assembly is simple, durable, inexpensive, easy to use and provides a maximum of flexibility in positioning the restraint component of the assembly adjacent to cargo without blocking off the remainder of the cargo bed from use and view.

The assembly comprises, in combination, a vehicle cargo bed liner, a cargo stop block and a releasable stop block securing means to releasably affix the block in a desired location to the liner.

The cargo bed liner has two opposite ends, which are referred to hereinafter as the rear and the front end, and which can extend from the rear of the cargo bed toward the front of the cargo bed or can extend transversely of the cargo bed from one side of the bed to the opposite side thereof. The cargo bed has a plurality of parallel, spaced upstanding ribs separated by parallel downwardly extending grooves, the ribs and grooves running from one end of the liner to the opposite end. The liner can be fabricated of metal, plastic or a combination thereof, or of any other suitable durable material and is adapted to be seated directly on the bottom of the cargo bed.

The cargo stop block has two opposite ends, referred to hereinafter for convenience in describing the block, as the rear and front ends of the block. The block also has a top, an opposite bottom and two opposite sides interconnected thereto. The bottom of the block defines a plurality of spaced parallel grooves extending from one end of the block to the opposite end. The grooves are separated by spaced, parallel depending ribs having opposite sides. The number, size and location of the block ribs and grooves are such that the block can be seated on the bed liner with the block ribs in the bed liner grooves and the block grooves receiving the bed liner ribs. The spacing of the block ribs in the bed liner grooves is such that the block ribs can be moved laterally in the grooves a relatively short distance.

A stop block lock is provided in the present assembly for releasably securing the block in a desired location to the bed liner. In one embodiment the lock comprises a body which has a depending rib fitting into a groove in the bed liner. The lock is positioned adjacent to one side of the stop block and has a draw bolt or screw running into the stop block. By turning the screw or bolt the stop block can be drawn laterally towards the lock until one side of each rib depending from the stop block tightly abuts a rib of the bed liner, thus holding the stop block in place until the draw screw or bolt is backed off to release the stop block.

In another embodiment, the lock body bears one half of a clamp and the stop block carries the other half of the clamp, the space between being bridged by a draw screw or the like. In a third embodiment, the stop block is split into two parts with the clamp bridging the two parts of the stop block. The clamp pulls the two parts of the stop block together to tighten one or more of the block ribs against one or more of the bed liner ribs.

The stop block and lock can be made of any suitable durable sturdy materials such as metal, hard plastic and the like. The stop block can be of any suitable size and preferably spans only a portion of the bed liner, preserving the rest of the cargo bed for other uses. A plurality of the stop blocks can be employed in various locations on the bed liner, as desired. Moreover, for convenience sake, one or a plurality of the same or different types of the described locks can be use with a stop block. The stop block can be of any desired height. As additional securing means, the sides of the block ribs can bear teeth or the like. Alternatively, the sides of the block ribs can bear flexible resilient strips.

Various other features of the improved assembly of the present invention are set forth in the following detailed description and accompanying drawings.

DRAWINGS OF THE EMBODIMENTS

DETAILED DESCRIPTION OF THE EMBODIMENTS

Figure 1:
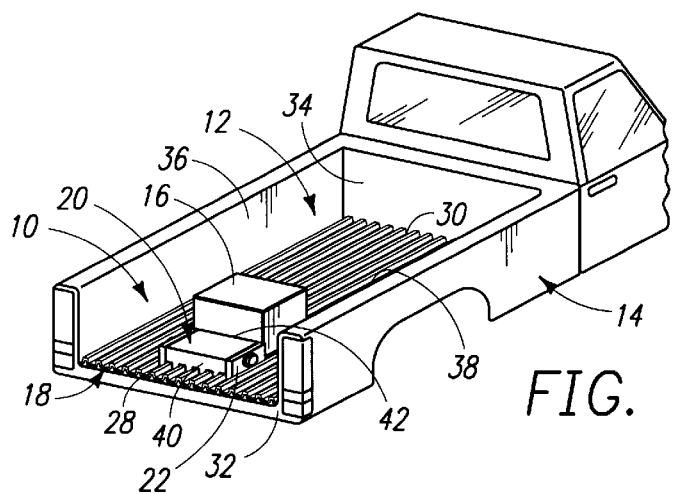
FIG. 1 is a schematic perspective view, partly broken away, showing a first preferred embodiment of the improved cargo restraint assembly of the present invention installed in the open bed of a truck.
Figure 2:
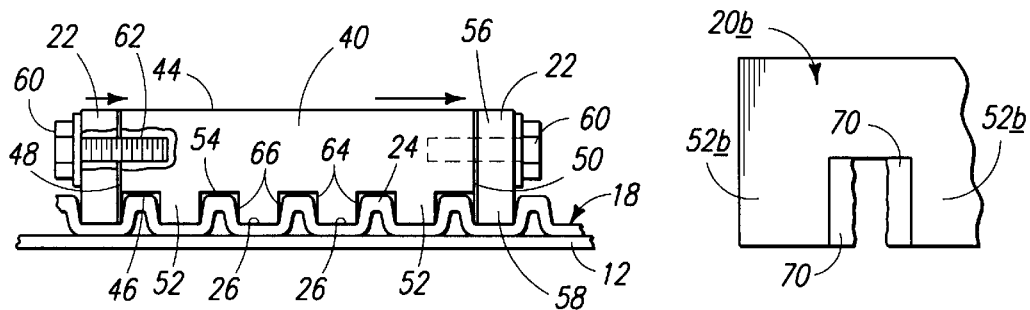
FIG. 2 is a schematic rear elevation, partly broken away, of the cargo restraint assembly of FIG. 1.

FIGS. 1 and 2:

Now referring more specifically to FIGS. 1 and 2 of the drawings, a first preferred embodiment of the improved cargo restraint assembly of the present invention is depicted therein. FIG. 1 shows assembly 10 disposed in the bed 12 of an open bed truck 14, blocking a cargo box 16 from shifting out of bed 12 while still permitting the use of the remainder of the space in bed 12 for other purposes.

Assembly 10 includes a vehicle cargo bed liner 18, stop block 20 and lock 22. Liner 18 has a plurality of spaced parallel upstanding ribs 24 separated by parallel downwardly extending grooves 26. Grooves 26 and ribs 24 run from one end, that is, rear end 28 to the opposite end, that is, front end 30 of liner 18. Liners 18 is oriented in bed 12 so that grooves 26 and ribs 24 run from the rear 32 to the front 34 of bed 12. However, it will be understood that, if desired, grooves 26 and ribs 24 could run from side 36 to side 38 of bed 12.

Stop block 20 has one end, that is, rear end 40 and an opposite end, that is, front end 42, a top 44, a bottom 46 and opposite sides 48 and 50. Block 20 extends across a portion of the width of liner 18. Bottom 46 defines a plurality of spaced parallel depending ribs 52 separated by spaced parallel grooves 54. Ribs 52 are dimensioned to easily fit into liner grooves 26 with a slight degree of play, while grooves 54 are dimensioned to easily receive ribs 24 with a slight degree of play. Thus, block 20 can be easily fitted over liner 18 at any desired location thereon.

Stop block 20 is releasably secured to liner 18 by either one or both of a pair of identical locks 22 disposed on opposite sides 48 and 50. Each lock 22 includes a body 56 adapted to abut block 20 and having a depending rib 58 dimensioned to fit into a groove 26. Each lock 22 also includes a threaded draw bolt or screw 60, the shank 62 of which passes into block 20, as shown in FIG. 2. When either bolt or screw 60 is turned to draw block 20 towards lock 22, the sides 64 of ribs 52 move into engagement with the the sides 66 of ribs 24 of liner 18 to hold block securely to liner 18. Block 20 is released from liner 18 by backing off bolt or screw 60. Thus, block 20 can be rapidly locked to liner 18 and just as easily released to provide improved assembly 10.

It will be understood that the following embodiments depicted in the drawings referred to below utilize liner 18, although that is not shown, and the only changes in construction are with respect to the stop block and lock used therein. Moreover, when the same numbers are used in the drawings and referred to in the text below as are used in FIGS. 1 and 2, but are succeeded by the letter a,b,c or d, it will be understood that the components referred to are the same or are similar to those of FIGS. 1 and 2.

Figure 3:
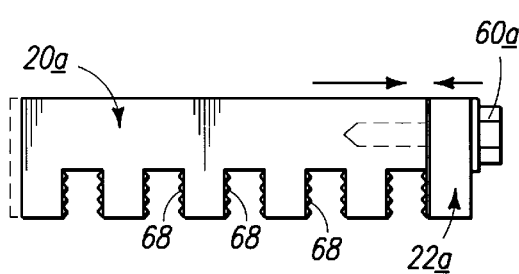
FIG. 3 is a schematic rear elevation of a second preferred embodiment of the stop block and lock of the improved cargo restraint assembly of the present invention.

FIG. 3:

A second preferred embodiment of the improved assembly of the present invention is schematically depicted in FIG. 3. Thus, block 20a and lock 22 a are shown, substantially identical to block 20 and lock 22, except as follows:

1) Block 20a has only one lock 22a; and,
2) One or both sides 64a of ribs 52a bear teeth 68 which aid in locking block 20a to liner 18.

Figure 5:
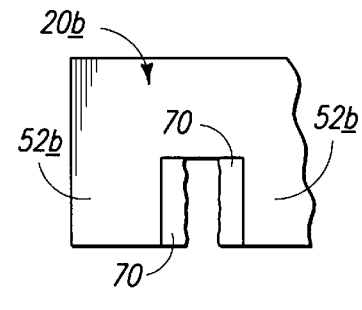
FIG. 5 is an enlarged fragmentary rear elevation of a portion of the depending ribs of the stop block of FIG. 4.
Figure 4:
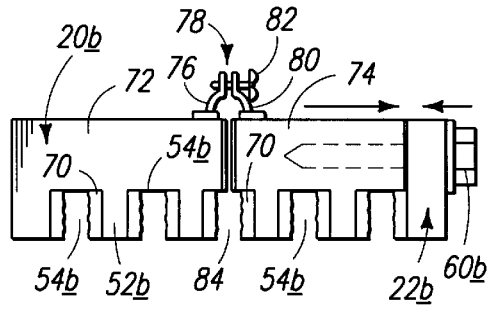
FIG. 4 is a schematic rear elevation of a third preferred embodiment of the stop block and lock of the improved cargo restraint assembly of the present invention.

FIGS. 4 and 5:

A third preferred embodiment of the improved assembly of the present invention is schematically depicted in FIGS. 4 and 5. Thus, block 20b and lock 22b are shown which are substantially identical to block 20 and lock 22, except as follows:

1) Sides 64b of ribs 52b bear strips 70 of flexible resilient elastomeric plastic or rubber which facilitate holding ribs 52b against the corresponding ribs 24 of liner 18; and,
2) Supplemental locking means are provided by having block 20b split vertically into two halves 72 and 74, with one arm 76 of a clamp 78 being secured to the top of half 72 and and the other arm 80 of clamp 78 being secured to the top of half 74, a draw screw 82 bridging arms 76 and 80 to releasably draw halves 72 and 74 together. Central groove 84 is slightly narrower than grooves 54b to facilitate the locking action.

Figure 6:
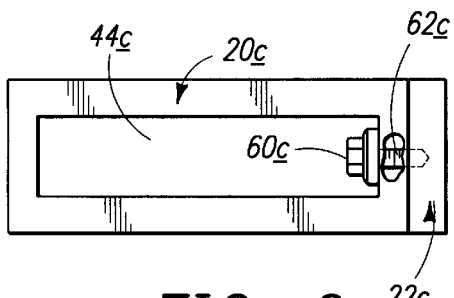
FIG. 6 is a schematic top plan view of a fourth preferred embodiment of the stop block and lock of the improved cargo restraint assembly of the present invention; and, FIG. 7 is a schematic rear elevation of a fifth preferred embodiment of the stop block and lock of the improved cargo restraint assembly of the present invention.

FIG. 6:

A fourth preferred embodiment of the improved assembly of the present invention is schematically depicted in FIG. 6. Thus, block 20c and lock 22c are depicted and are substantially similar to block 20 and lock 22, except as follows:

1) The top 44c of block 20c is hollowed out; and,
2) Draw bolt or screw 60c has shank 62c pass from block 20c into lock 22c to accomplish the same locking effect as lock 22 performs.

Figure 7:
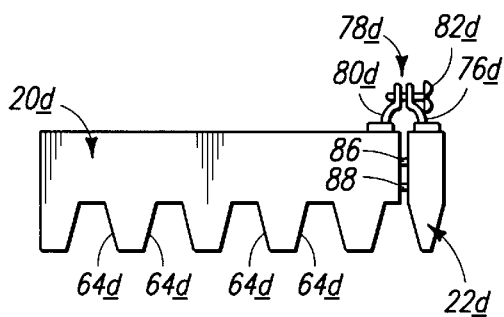

FIG. 7:

A fifth preferred embodiment of the improved assembly of the present invention is schematically depicted in FIG. 7. Thus, block 20d and lock 22d are depicted and are similar to block 20 and lock 22, except as follows:

1) Sides 64d of ribs 52d slope upwardly towards each other to provide a wedging action;
2) Clamp 78d has arm 76d secured to the top of lock 22d while arm 80d of clamp 78d is secured to top 44d of block 20d, with draw screw 82d bridging arms 76d and 80d; and,
3) guide pins 86 and 88 are secured to lock 22 and pass transversely into openings (not shown) in block 20d to help align lock 22d with block 20d.

The described embodiments all have similar advantages over the known prior art, as previously described.

Various modifications, changes, alterations and additions can be made in the improved cargo restraint assembly of the present invention, its components and parameters. All such modifications, changes, alterations and additions as are within the scope of the appended claims form part of the present invention.

What is claimed is:

1. An improved cargo restraint assembly for a vehicle cargo bed, said assembly comprising, in combination:

a) a vehicle cargo bed liner adapted to seat on the floor of a vehicle cargo bed, said liner having a front end and an opposite rear end, said liner having a plurality of parallel, spaced upstanding ribs separated by parallel downwardly extending grooves, said grooves and ribs extending forwardly from said liner rear end to said liner front end;

b) a cargo stop block having a rear end, an opposite front end, a top and a bottom interconnected by opposite sides, said bottom defining a plurality of spaced parallel grooves extending forwardly from said rear end of said block to said front end of said block, said block grooves being separated by a plurality of spaced parallel depending ribs having opposite sides, said block being seated on said bed liner with said block grooves receiving said liner ribs and said bed liner grooves receiving said stop block ribs; and, c) stop block securing means releasably securing said stop block to said bed liner, said securing means including at least one lock which releasably draws said block ribs into engagement with said bed liner ribs.

2. The improved assembly of claim 1 wherein said lock comprises a body which has a depending rib received within one of said bed liner grooves, said body being disposed adjacent a side of said block and being connected thereto by draw means which extends into the adjacent side of said block and are adapted to draw said block ribs laterally into engagement with said bed liner ribs.

3. The improved assembly of claim 2 wherein said draw means comprise one of a threaded bolt and a threaded screw.

4. The improved assembly of claim 3 wherein a second said lock is disposed adjacent another side of said block.

5. The improved assembly of claim 1 wherein said block is split vertically into two adjacent parts and wherein said lock comprises a clamp having two adjacent portions, one portion being secured to the top of one of said parts of said block and the other of said portions being secured to the top of the second of said parts of said block, said clamp including a draw screw bridging said two clamp portions for releasably drawing said two parts of said block laterally toward each other for engaging said block ribs with said bed liner ribs.

6. The improved assembly of claim 1 wherein said lock comprising a body which is disposed adjacent a side of said block and includes a depending rib extending down into one of said bed liner grooves and a guide pin extending laterally into an opening defined in said block, said lock also including a clamp having two adjacent portions, one of said clamp portions being secured to said lock body and the other of said two clamp portions being secured to said block, said clamp including a draw screw bridging said two clamp portions for releasably drawing said block laterally towards said lock for securing said block to said bed liner.

7. The improved assembly of claim 1 wherein said block ribs bear bed liner rib-gripping means.

8. The improved assembly of claim 7 wherein said gripping means comprise teeth defined in said sides of said block ribs.

9. The improved assembly of claim 7 wherein said gripping means comprise flexible resilient strips disposed on said sides of said block ribs.

\* \* \* \* \*